US012785608B2

(12) United States Patent
Wang et al.

(10) Patent No.: US 12,785,608 B2
(45) Date of Patent: Nov. 3, 2026

(54) CONTROL DEVICE, MACHINE SYSTEM, AND DISPLAY DEVICE

(71) Applicant: FANUC CORPORATION, Yamanashi (JP)

(72) Inventors: Dong Wang, Yamanashi (JP); Takafumi Kajiyama, Yamanashi (JP); Shunsuke Abiko, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 175 days.

(21) Appl. No.: 18/691,457

(22) PCT Filed: Oct. 7, 2021

(86) PCT No.: PCT/JP2021/037217
§ 371 (c)(1),
(2) Date: Mar. 13, 2024

(87) PCT Pub. No.: WO2023/058203
PCT Pub. Date: Apr. 13, 2023

(65) Prior Publication Data
US 2024/0405713 A1 Dec. 5, 2024

(51) Int. Cl.
*H02P 29/032* (2016.01)
*B25J 9/16* (2006.01)
*H02P 29/028* (2016.01)

(52) U.S. Cl.
CPC .......... *H02P 29/032* (2016.02); *B25J 9/1674* (2013.01); *H02P 29/028* (2013.01)

(58) Field of Classification Search
CPC ...... H02P 29/032; H02P 29/028; B25J 9/1674
See application file for complete search history.

(56) References Cited

U.S. PATENT DOCUMENTS 6,023,961 A * 2/2000 Discenzo .............. F16C 41/008 73/61.79
10,598,650 B2 * 3/2020 Worden ............. G01N 33/2888
2003/0133242 A1 * 7/2003 Buchholz ................ F01P 7/042 361/103

FOREIGN PATENT DOCUMENTS

DE 3727121 A1 * 2/1989 ........... B60G 17/018
JP H02-184281 A 7/1990
JP H11-015511 A 1/1999
JP 2006-146572 A 6/2006
JP 2006263916 A 10/2006
JP 2007301660 A 11/2007
JP 2016-127668 A 7/2016
JP 2018-147264 A 9/2018
JP 2020-019117 A 2/2020
JP 2020-198657 A 12/2020

* cited by examiner

*Primary Examiner* — Bickey Dhakal
(74) *Attorney, Agent, or Firm* — HAUPTMAN HAM, LLP

(57) ABSTRACT

This control device comprises: a temperature acquiring unit that acquires a detected temperature; a friction force calculation unit that calculates a viscous friction force generated in an actuator of a machine at the detected temperature and a reference temperature; and a control unit that limits, on the basis of the viscous friction force, the operation of the machine so as not to exceed the ability of the actuator.

10 Claims, 5 Drawing Sheets

CONTROL DEVICE, MACHINE SYSTEM, AND DISPLAY DEVICE

RELATED APPLICATIONS

The present application is a National Phase of International Application No. PCT/JP2021/037217 filed Oct. 7, 2021.

FIELD

The present invention relates to a control technique of a machine, and particularly relates to a control device, a machine system, and a display device having a function of dealing with a change in viscous friction.

BACKGROUND

A technique for stopping motion of a machine by issuing an excessive error alarm when a position error being a deviation between a command movement amount and an actual movement amount of a servomotor is equal to or more than a prescribed value, has been proposed (for example, PTL 1). However, when a machine is left standing in a low-temperature environment for a fixed period of time, kinematic viscosity of a lubricant that lubricates an actuator of the machine increases. Thus, when the cooled machine starts motion, a motion command exceeding capacity of the servomotor may be input in response to an increase in a viscous frictional force generated in the actuator, a deviation between a command position and an actual position may increase, a position error may exceed a prescribed value, and an excessive error alarm may be issued. In this case, an abnormality is determined, and motion of the machine is stopped, which also leads to a stopping of the entire system including the machine, and results in an adverse influence on production, operation, and the like.

On the other hand, when the machine is in a high-temperature environment, kinematic viscosity of the lubricant decreases, and a viscous frictional force generated in the actuator decreases. Thus, a position error does not exceed the prescribed value, and the error increasing alarm is not issued. However, in the high-temperature environment, there is a possibility that a motion limitation on a speed, acceleration, and the like of the servomotor at a reference temperature (for example, a normal temperature) can be slightly relaxed within a range that capacity of the actuator is not exceeded. As the background art related to the present application, the following literature is publicly known.

In order to solve a problem that it takes considerable time to detect an abnormality at a low rotation speed of a motor when a threshold value of a position error at a maximum rotation speed of the motor is set, PTL 1 describes the following. A simulation of a servo control system approximated by a first order transmission function by using, as a time constant, a reciprocal of a position gain of the servo control system is performed simultaneously with driving control of a servomotor, and an excessive error alarm is issued when a position error acquired from the simulation and an actual position error acquired from the servo control are equal to or more than a predetermined value.

When a robot is operated in a low-temperature environment, grease (lubricant) used for a mechanism unit including a motor and a reduction gear becomes hard, and friction increases further than that in a normal-temperature environment. Thus, an estimated disturbance value exceeds a threshold value regardless of no occurrence of a collision in reality, and the collision is detected by mistake. Accordingly, PTL 2 describes that whether a driving axis of a robot is in a low-temperature environment is determined in a control device of the robot, and a threshold value is corrected upward from a value for the normal-temperature environment when the driving axis is determined to be in the low-temperature environment.

PTL 3 describes a servo control device. The servo control device has purposes of more accurately determining a frictional force that changes with time and temperature, switching a frictional coefficient dynamically with respect to a time change and a temperature change without depending on a change in time and temperature, and always maintaining control performance of position control and flexible control high. The servo control device performs a simulation on position control and speed control, compares an output of a speed controller and an output of a simulation speed controller, generates a friction model from the output of a comparison unit, and performs compensation based on an output of the friction model.

In order to solve the following problems, PTL 4 describes a robot control device that controls a detection means for detecting a collision of a robot in such a way that the collision of the robot is less likely to be detected when a predetermined condition indicating that a temperature of the robot is low is satisfied. The problems include a problem that a collision cannot be detected due to a change in a threshold value in spite of the fact that a temperature of a robot is not low and friction is not great when adopting a configuration for changing a threshold value of a disturbance value by determining whether an elapsed time since motor power is turned on exceeds a prescribed value, and a problem that a collision cannot be detected due to a failure to determine whether an estimated value of a frictional coefficient converges by a frictional change in a region where a temperature of a robot is low when adopting a configuration for changing a threshold value of a disturbance value by determining whether a change amount of an estimated value of a frictional coefficient is equal to or less than a prescribed value.

PTL 5 describes a motor control device having purposes of appropriately estimating a frictional force acting on an output shaft of a motor and compensating for disturbance by a frictional force without requiring highly precise modeling of a frictional characteristic and highly precise identification of a related physical quantity. The motor control device includes a disturbance observer device that receives, as a control input, a current command value to a motor, a rotation speed of the motor, and a measurement value of torsion torque of an output shaft connected to the motor via a speed reduction mechanism, and suppresses disturbance by frictional torque acting on the output shaft of the motor. The disturbance observer device calculates a torque compensation value for compensating for frictional torque, based on the control input, and a sensitivity function indicating a characteristic of compensation value calculation is set based on the rotation speed of the motor.

CITATION LIST

Patent Literature

[PTL 1] Japanese Unexamined Patent Publication (Kokai) No. H02-184281 A

[PTL 2] Japanese Unexamined Patent Publication (Kokai) No. H11-15511 A

[PTL 3] Japanese Unexamined Patent Publication (Kokai) No. 2006-146572 A
[PTL 4] Japanese Unexamined Patent Publication (Kokai) No. 2020-019117 A
[PTL 5] Japanese Unexamined Patent Publication (Kokai) No. 2020-198657 A

SUMMARY

Technical Problem

An object of the present invention is, in view of the conventional problems, to provide a control technique of a machine that deals with a change in viscous friction.

Solution to Problem

One aspect of the present disclosure provides a control device including: a temperature acquisition unit configured to acquire a detected temperature; a frictional force calculation unit configured to calculate a viscous frictional force generated in an actuator of a machine at the detected temperature and a reference temperature; and a control unit configured to impose a motion limitation on the machine, based on the viscous frictional force, in such a way that capacity of the actuator is not exceeded.

Another aspect of the present disclosure provides a machine system including: a machine; a temperature sensor; a temperature acquisition unit configured to acquire a detected temperature from the temperature sensor; a frictional force calculation unit configured to calculate a viscous frictional force generated in an actuator of the machine at the detected temperature and a reference temperature; and a control unit configured to impose a motion limitation on the machine, based on the viscous frictional force, in such a way that capacity of the actuator is not exceeded.

A different aspect of the present disclosure provides a display device including a display unit that emphasizes and displays a motion command of an actuator or a machine on which a motion limitation is imposed when a state is determined to be a temperature state where the motion limitation is to be imposed on the machine.

Advantageous Effects of Invention

According to the one aspect and the other aspect of the present disclosure, even when a viscous frictional force increases due to a low-temperature environment, a motion limitation on a machine is tightened in such a way that capacity of an actuator is not exceeded. Accordingly, occurrence of an excessive error alarm of a position error can be prevented, and thus the machine can continue motion. On the other hand, when a viscous frictional force decreases due to a high-temperature environment, a motion limitation on the machine is relaxed in such a way that capacity of the actuator is not exceeded. Accordingly, the machine can perform motion relatively rapidly.

In the present disclosure, a term "imposing a motion limitation" includes not only a case where a motion limitation on a machine is tightened when a viscous frictional force increases due to a low-temperature environment, but also a case where a motion limitation on a machine is relaxed when a viscous frictional force decreases due to a high-temperature environment.

According to the different aspect of the present disclosure, when a state is determined to be a temperature state where a motion limitation is to be imposed on a machine, a motion command of an actuator or the machine on which the motion limitation is imposed is emphasized and displayed on the display unit, and thus a user can visually recognize the motion command of the actuator or the machine on which the limitation is imposed, and can easily recognize that the machine is not performing motion as intended.

DESCRIPTION OF EMBODIMENTS

Hereinafter, embodiments according to the present disclosure will be described in detail with reference to accompanying drawings. The same or similar element is denoted by the same or similar reference sign in each of the drawings. Further, the embodiments described below do not limit a technical scope of the invention described in claims and meaning of a term. It should be noted that, in the present specification, a term "low temperature" means a temperature (for example, lower than 10° C.) lower than a reference temperature (for example, 25° C.), and a term "high temperature" means a temperature (for example, higher than 40° C.) higher than the reference temperature. Further, it should be noted that, in the present specification, a term "frictional force" includes not only a frictional force in a narrow sense but also frictional torque.

Figure 1:
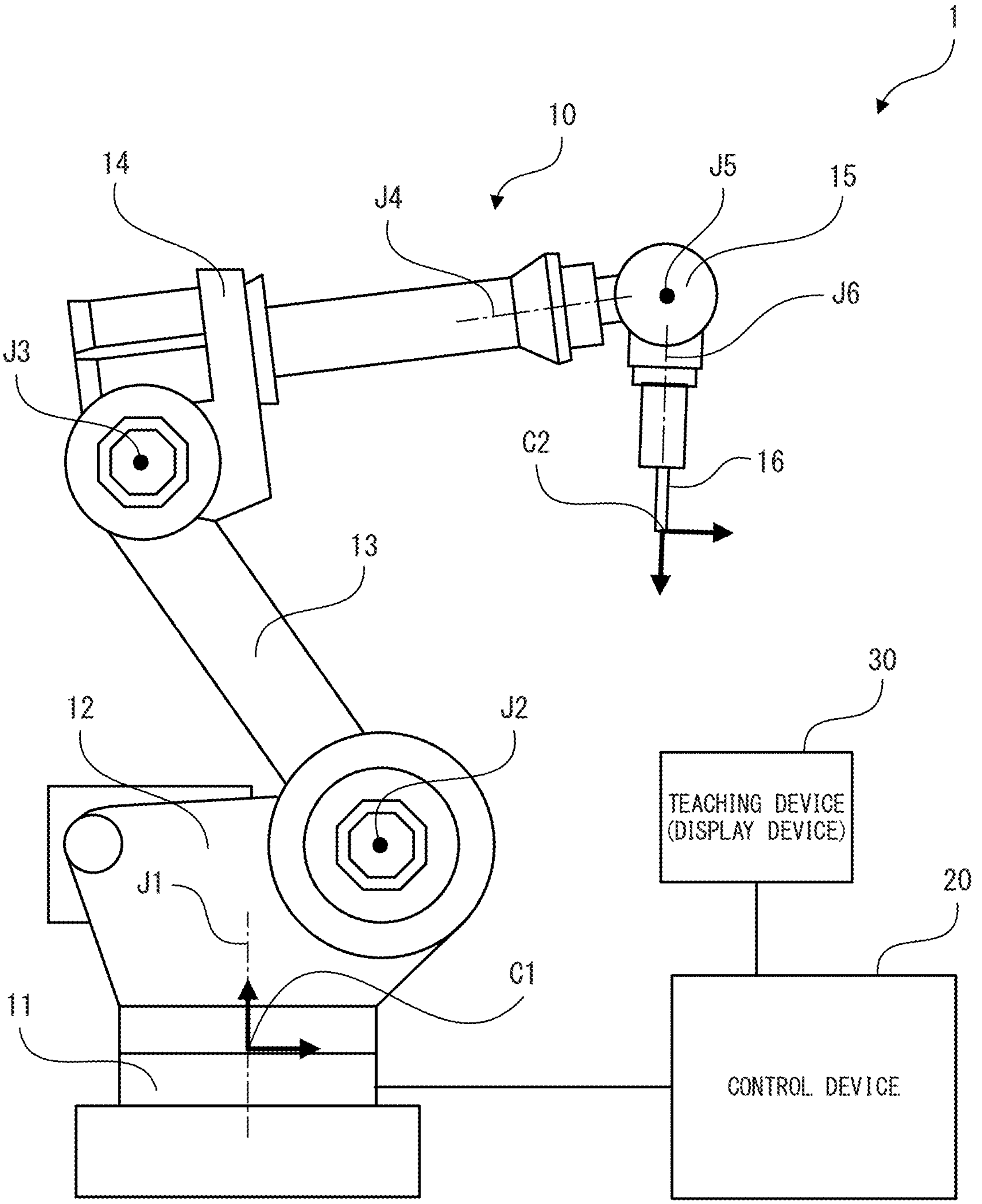
FIG. 1 is a configuration diagram of a machine system according to one embodiment.
Figure 2:
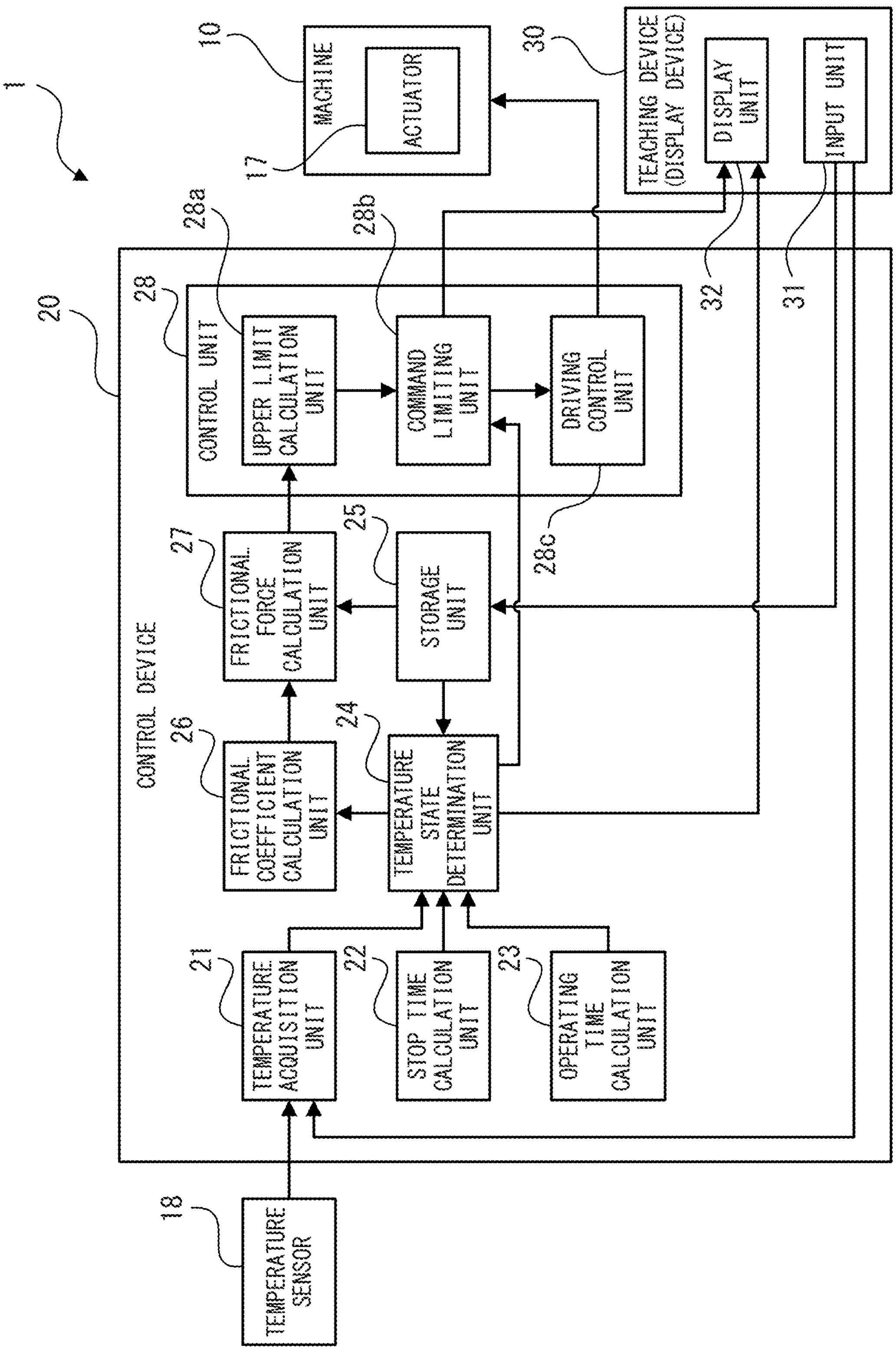
FIG. 2 is a functional block diagram of the machine system according to one embodiment.
Figure 3:
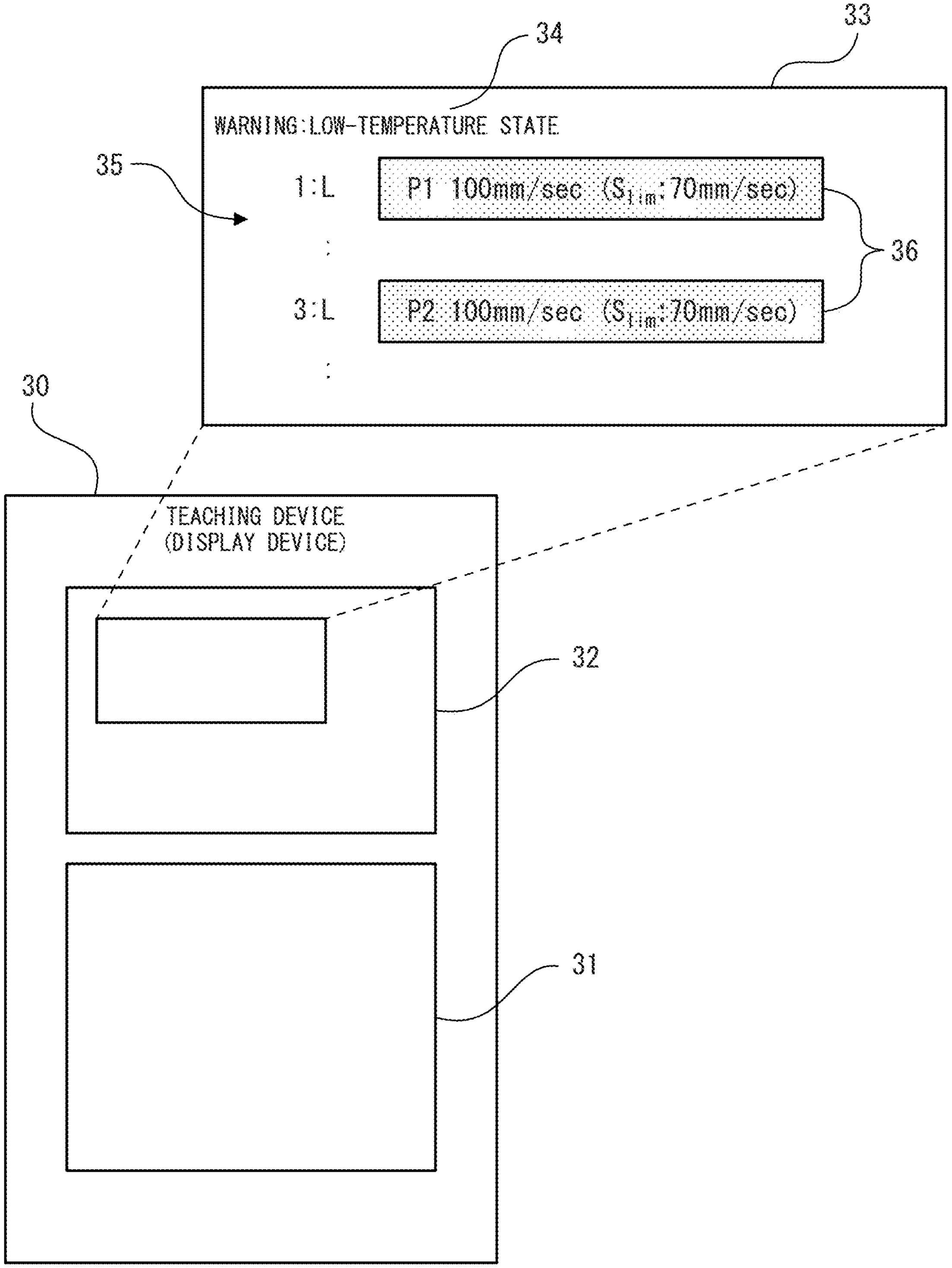
FIG. 3 is a user interface diagram of a teaching device (display device) according to one embodiment.

Hereinafter, one example of a configuration of a machine system 1 according to one embodiment will be described in detail. FIG. 1 is a configuration diagram of the machine system 1 according to the present embodiment. FIG. 2 is a functional block diagram of the machine system 1 according to the present embodiment. FIG. 3 is a user interface diagram of a teaching device 30 (display device) according to the present embodiment. The machine system 1 includes a machine 10, and a control device 20 that controls the machine 10. Further, although it is not essential, the machine system 1 further includes the teaching device 30 that teaches operations to the machine 10 and checks a state of the machine 10.

The machine 10 is formed of a multijoint robot, which is not limited thereto. In another embodiment, the machine 10 may be formed of another industrial robot (robot arm) such as a single joint robot, a dual arm robot, and a parallel link robot. Alternatively, in a different embodiment, the machine 10 may be formed of a robot in another manner such as a humanoid, instead of an industrial robot. Alternatively, in a still different embodiment, the machine 10 may also be formed of another industrial machine such as a construction machine and an agricultural machine or another machine such as a vehicle and an aircraft, instead of a robot.

The machine 10 includes a base 11, and a revolving barrel 12 supported rotatably about a first axis line J1 with respect to the base 11. Further, the machine 10 includes a first arm 13 supported rotatably about a second axis line J2 orthogonal to the first axis line J1 with respect to the revolving barrel 12, a second arm 14 supported rotatably about a third axis line J3 parallel to the second axis line J2 with respect to the first arm 13, and a three-axis wrist unit 15 attached to a tip of the second arm 14. Furthermore, the machine 10 may include a tool 16 that can be attached to a tip of the wrist unit 15. The tool 16 includes, for example, a hand, a cutting tool, a fastening tool, a welding tool, a sealing tool, and the like.

In this way, the machine 10 includes a plurality of relatively movable links such as the revolving barrel 12, the first arm 13, the second arm 14, and the wrist unit 15. Since the machine 10 according to the present embodiment is a multiaxial machine, the machine 10 includes a plurality of actuators 17 (see FIG. 2) that each drive the plurality of associated links, which is not limited thereto. In another embodiment of a uniaxial machine, the machine 10 may include only one actuator 17. The actuator 17 is provided on a link coupling portion (for example, a robot joint portion). The actuator 17 is formed of an electric actuator including an electric motor such as a servomotor or an electric motor that couples mechanical elements such as a shaft, a bearing, a gear, and a reduction gear, which is not limited thereto. In another embodiment, the actuator 17 may be formed of an actuator in another manner using other energy, such as a hydraulic manner, a pneumatic manner, and a magnetic manner, and a combination thereof.

Further, the actuator 17 is formed of a rotary actuator including a rotary motor, which is not limited thereto. In another embodiment, the actuator 17 may be formed of a linear actuator including a linear motor. Mechanical elements such as a shaft, a bearing, and a gear of the actuator 17 are lubricated by a lubricant (not illustrated) such as grease and lubricating oil. Since a lubricant has kinematic viscosity changing in accordance with temperature, a viscous frictional force generated in the actuator 17 also changes.

Thus, the machine system 1 further includes a temperature sensor 18. The temperature sensor 18 is formed of a thermocouple, a thermistor, a resistance temperature detector, or the like. The temperature sensor 18 is an existing temperature sensor mounted on the actuator 17 (for example, an electric motor), which is not limited thereto. In another embodiment, the temperature sensor 18 may be a temperature sensor mounted inside a lubricating room that lubricates the actuator 17 (for example, a reduction gear and a bearing), a temperature sensor mounted inside or outside the machine 10, a temperature sensor mounted on the control device 20 or the teaching device 30, or a temperature sensor disposed near the control device 20 or the teaching device 30. The existing temperature sensor 18 detects a temperature of the actuator 17 (for example, a coil, a stator core, a bearing, and the like of an electric motor), whereas the other temperature sensor 18 detects a temperature of a lubricant inside a lubricating room and detects an ambient temperature (fluid temperature around the machine 10) inside or outside the machine 10. An ambient temperature outside the machine 10 is a so-called environmental temperature.

The control device 20 is formed of a publicly known programmable logic controller (PLC), which is not limited thereto. In another embodiment, the control device 20 may be formed of another computer device. Although it is not illustrated, the control device 20 includes a processor, a memory, an input/output interface, a timer, and the like (not illustrated) that are connected to one another with a bus. The processor includes a central processing unit (CPU), a micro processing unit (MPU), and the like. The memory includes a random access memory (RAM), a read only memory (ROM), and the like. The input/output interface includes an A/D converter, a D/A converter, and the like.

As illustrated in FIG. 3, the control device 20 controls motion of the machine 10 according to a motion program 35 taught by the teaching device 30. The motion program 35 includes various motion commands 36 such as a position command (for example, a movement command to teaching points P1, P2, and the like) and a speed command (for example, a speed command (100 mm/sec) of the actuator 17 or a tip of the machine 10). As illustrated in FIG. 2, the control device 20 acquires a detected temperature, calculates a viscous frictional force generated in the actuator 17 at the detected temperature and a reference temperature, and imposes a motion limitation on the machine 10, based on the viscous frictional force, in such a way that capacity of the actuator 17 (for example, an electric motor, particularly a servomotor) is not exceeded.

With reference to FIG. 1 again, the control device 20 sets various coordinate systems such as a world coordinate system, a machine coordinate system, a flange coordinate system, a tool coordinate system, a camera coordinate system, and a user coordinate system. The coordinate systems may be, for example, an orthogonal coordinate system. In order to make description easy, in the present embodiment, the control device 20 is assumed to set a machine coordinate system C1 and a tool coordinate system C2. The machine coordinate system C1 is fixed to a reference position (for example, a base) of the machine 10, and the tool coordinate system C2 is fixed to a reference position (for example, a tool center point (TCP)) of the tool 16.

As illustrated in FIG. 1, the teaching device 30 is formed of a teaching operation panel, which is not limited thereto. In another embodiment, the teaching device 30 may be formed of a teaching pendant, another computer device, or the like. As illustrated in FIG. 2 and FIG. 3, the teaching device 30 includes an input unit 31 that inputs various pieces of information, and a display unit 32 that displays various pieces of information. The input unit 31 is formed of, for example, a keyboard and the like. The display unit 32 is formed of, for example, a display and the like.

As illustrated in FIG. 3, the teaching device 30 displays, on the display unit 32, an edit window 33 of the motion program 35 of the machine 10, and designates various motion commands 36 such as the position command and the speed command by the input unit 31. The teaching device 30 transfers the edited or created motion program 35 to the control device 20. The control device 20 controls motion of the actuator 17 according to the motion command 36 of the motion program 35.

In the machine system 1 configured as described above, when the machine 10 is left standing in a low-temperature environment for a fixed period of time, kinematic viscosity of a lubricant that lubricates the actuator 17 of the machine 10 increases. Thus, when the cooled machine 10 starts motion, the motion command 36 exceeding capacity of the actuator 17 may be input in response to an increase in a viscous frictional force generated in the actuator 17, a deviation between a command position and an actual position may increase, a position error may exceed a prescribed value, and an excessive error alarm may be issued. Therefore, the control device 20 has a function of dealing with a change in a viscous frictional force. In a low-temperature environment, the control device 20 tightens a motion limitation on a speed, acceleration, and the like of the actuator 17 or the machine 10, and performs control in such a way as to start motion of the machine 10 relatively slowly.

On the other hand, when the machine 10 is in a high-temperature environment, kinematic viscosity of the lubricant decreases, and a viscous frictional force generated in the actuator 17 decreases. Thus, a position error does not exceed the prescribed value, and no error increasing alarm is issued. However, in the high-temperature environment, the control device 20 relaxes a motion limitation on a speed, acceleration, and the like of the actuator 17 or the machine 10 at a reference temperature, and performs control in such a way as to execute motion of the machine 10 relatively rapidly.

As illustrated in FIG. 2, the control device 20 includes a temperature acquisition unit 21 that acquires a detected temperature from the temperature sensor 18, a frictional force calculation unit 27 that calculates a viscous frictional force generated in the actuator 17 of the machine 10 at the detected temperature and a reference temperature, and a control unit 28 that imposes a motion limitation on the machine 10, based on the viscous frictional force, in such a way that capacity of the actuator 17 is not exceeded.

Further, the control device 20 may include a storage unit 25 that stores various pieces of information. The storage unit 25 is formed of a memory such as a RAM and a ROM. The storage unit 25 stores a threshold value of a detected temperature, a threshold value of a stop time before operation of the machine 10, a threshold value of an operating time after operation of the machine 10, a viscous frictional force estimation equation, and the like.

It should be noted that a component other than the storage unit 25 of the control device 20 is formed of a part or the whole of a computer program, which is not limited thereto. In another embodiment, the component may be formed of a part or the whole of an electric circuit, a semiconductor integrated circuit, or the like. Further, in another embodiment, an element other than the control unit 28 may be disposed in a host computer device that can be connected to the control device 20 in a wired or wireless manner.

The temperature acquisition unit 21 acquires a detected temperature by multiplying, by a temperature coefficient, an output value (for example, a voltage value and the like) of the temperature sensor 18 subjected to A/D conversion, and converting the output value to a temperature of the actuator 17 (for example, a coil, a stator core, and the like of an electric motor). In other words, even when the temperature sensor 18 outputs a temperature of a lubricant or an ambient temperature inside or outside the machine 10, the temperature acquisition unit 21 acquires a temperature of the actuator 17. A temperature coefficient that converts an output value of the temperature sensor 18 to a temperature of the actuator 17 may be stored in the storage unit 25 or defined in a program.

The frictional force calculation unit 27 calculates each of a viscous frictional force $\tau_d$ generated in the actuator 17 at a detected temperature and a viscous frictional force $\tau_r$ generated in the actuator 17 at a reference temperature. In this way, the control unit 28 can impose a motion limitation on the machine 10, based on a change amount $\Delta\tau$ ($=\tau_d-\tau_r$) of the viscous frictional force between the detected temperature and the reference temperature. The viscous frictional force $\tau$ is obtained from the following viscous frictional force estimation equation, for example.

[Mathematical 1]

$$\tau = \mu(v \cdot s)^n \qquad \text{Equation 1}$$

In the viscous frictional force estimation equation (Equation 1), $\mu$ is a viscous frictional coefficient, v is kinematic viscosity of a lubricant, s is a speed (for example, a rotation speed) of the actuator 17, and n is an exponent of a constant. The kinematic viscosity v in Equation 1 is obtained from the following kinematic viscosity estimation equation, based on the publicly known Andrade's viscosity calculation equation and a definition of kinematic viscosity.

[Mathematical 2]

$$v = f\exp\left(\frac{e}{T}\right) \qquad \text{Equation 2}$$

In the kinematic viscosity estimation equation (Equation 2), f and e are constants, and T is a temperature (for example, an absolute temperature) of a lubricant. As described above, the temperature acquisition unit 21 acquires a detected temperature of the actuator 17 (for example, a coil, a stator core, a bearing, and the like of an electric motor), and thus the frictional force calculation unit 27 estimates a temperature T of the lubricant, based on the detected temperature of the actuator 17. The constants f and e are predetermined based on data such as a temperature, viscosity, and a density of the lubricant used for the actuator 17. The constants f and e may be stored in the storage unit 25 or defined in a program.

Further, the viscous frictional coefficient $\mu$ in the viscous frictional force estimation equation (Equation 1) is predetermined by causing the machine 10 to perform standard motion in various temperature environments (such as a low-temperature environment, a reference temperature, and a high-temperature environment), and performing, in advance, an experiment that identifies the viscous frictional coefficient $\mu$ from Equation 1, based on a command value (such as a speed command value and a torque command value), a detection value (such as a speed detection value and a torque detection value), a temperature, and the like of the actuator 17. The viscous frictional coefficient $\mu$ may be stored in the storage unit 25 as a database in association with various temperatures or defined in a program.

Alternatively, as illustrated in FIG. 2, the control device 20 may further include a frictional coefficient calculation unit 26 that calculates a viscous frictional coefficient $\mu_d$ at a detected temperature and a viscous frictional coefficient $\mu_r$ at a reference temperature. The frictional coefficient calculation unit 26 causes the machine 10 to perform standard motion at the detected temperature and the reference temperature, and calculates the viscous frictional coefficients $\mu_d$ and $\mu_r$, based on a command value (such as a speed command value and a torque command value), a detection value (such as a speed detection value and a torque detection value), the detected temperature, the reference temperature, and the like of the actuator 17. The viscous frictional coefficients $\mu_d$ and $\mu_r$ at the detected temperature and the reference temperature may be stored in the storage unit 25 or defined in a program.

Alternatively, the frictional force calculation unit 27 may perform an experiment that identifies a relationship between a temperature and a viscous frictional force without using the viscous frictional coefficient $\mu$, predetermine a temperature-frictional force database, and calculate each of viscous frictional forces $\tau_d$ and $\tau_r$ at a detected temperature and a reference temperature, based on the temperature-frictional force database. The temperature-frictional force database may be stored in the storage unit 25 or defined in a program.

Further, as the speed s of the actuator 17 in the viscous frictional force estimation equation (Equation 1), a maximum speed $s_{max}$ (for example, a maximum rotation speed) in terms of specifications of the actuator 17 at a reference temperature may be used in such a way that a motion limitation on the machine 10 at a detected temperature is not too tightened. The maximum speed $s_{max}$ of the actuator 17 at the reference temperature may be stored in the storage unit 25 or defined in a program.

The control unit 28 imposes a motion limitation on the machine 10, based on the viscous frictional forces $\tau_d$ and $\tau_r$ at the detected temperature and the reference temperature being calculated as described above, in such a way that capacity of the actuator 17 is not exceeded. The control unit 28 includes an upper limit calculation unit 28*a* that calculates an upper limit value of motion of the actuator 17 or the machine 10, a command limiting unit 28*b* that limits the motion command 36 of the actuator 17 or the machine 10, based on the upper limit value, and a driving control unit 28*c* that controls driving of the actuator 17, based on the motion command 36 on which the motion limitation is imposed.

The upper limit calculation unit 28*a* calculates an upper limit value of at least one of a speed and acceleration of the actuator 17, based on the change amount $\Delta\tau$ ($=\tau_d-\tau_r$) of the viscous frictional force between the detected temperature and the reference temperature. An upper limit value $s_{lim}$ of the speed of the actuator 17 at the detected temperature is calculated from the following equation, for example.

[Mathematical 3]

$$s_{lim}=\left(\frac{\tau_d-\Delta\tau}{\mu_d}\right) \quad \text{Equation 3}$$

In Equation 3, $\tau_d$ is a viscous frictional force at the detected temperature, $\Delta\tau$ is a change amount of the viscous frictional force between the detected temperature and the reference temperature, and $\mu_d$ is a viscous frictional coefficient at the detected temperature. In other words, the upper limit calculation unit 28*a* tightens or relaxes the upper limit value $s_{lim}$ of the speed by the change amount $\Delta\tau$ of the viscous frictional force between the detected temperature and the reference temperature.

Meanwhile, an upper limit value $a_{lim}$ of the acceleration of the actuator 17 is calculated from the following equation, for example.

[Mathematical 4]

$$a_{lim}=\left(\frac{a_{max}\cdot J_m-\Delta\tau}{J_m}\right) \quad \text{Equation 4}$$

In Equation 4, $a_{max}$ is maximum acceleration of the actuator 17, $J_m$ is moment of inertia (for example, rotor inertia), and $\Delta\tau$ is a change amount of the viscous frictional force between the detected temperature and the reference temperature. In other words, the upper limit calculation unit 28*a* tightens or relaxes the upper limit value $a_{lim}$ of the acceleration by the change amount $\Delta\tau$ of the viscous frictional force between the detected temperature and the reference temperature.

The command limiting unit 28*b* limits at least one of a speed command and an acceleration command (a current command (for example, a torque command)) of the actuator 17 in such a way that at least one of the upper limit value $s_{lim}$ of the speed and the upper limit value $a_{lim}$ of the acceleration of the actuator 17 is not exceeded. In other words, the command limiting unit 28*b* limits at least one of the speed command and the acceleration command of the actuator 17 in the motion program 35.

Alternatively, in another embodiment, the command limiting unit 28*b* may limit at least one of a speed command and an acceleration command of the machine 10 in such a way that respective upper limit values $s_{lim1}$ to $s_{limn}$ and $a_{lim1}$ to $a_{limn}$ of the speed and the acceleration of n (n is an integer of one or more) actuator 17.

The speed and the acceleration of the machine 10 are a speed and acceleration of a tip (for example, an origin of the tool coordinate system C2) of the machine 10. Further, since the machine 10 includes n actuator 17, the command limiting unit 28*b* converts, based on forward kinematics, the upper limit values $s_{lim1}$ to $s_{limn}$ and $a_{lim1}$ to $a_{limn}$ of at least one of the speed and the acceleration of each n actuator 17 to upper limit values $S_{lim}$ and $A_{lim}$ of at least one of the speed and the acceleration of the tip of the machine 10.

The upper limit values $s_{lim1}$ to $s_{limn}$ of the speed of each n actuator 17 are expressed by differentiating positions $q_1$ to $q_n$ (for example, a rotational angle for a rotary actuator, a linear position for a linear actuator) of the actuator 17 with respect to a time t. On the other hand, the upper limit value $S_{lim}$ of the speed of the tip of the machine 10 is expressed by differentiating a position and a posture (x, y, z, ω, p, r) (for example, a position and a posture of the tool coordinate system C2 in the reference coordinate system C1) of the machine 10 with respect to the time t. Therefore, the upper limit value $S_{lim}$ of the speed of the tip of the machine 10 is obtained from, for example, the following equation by forward kinematics.

[Mathematical 5]

$$S_{lim}=\begin{pmatrix}\frac{dx}{dt}\\ \frac{dy}{dt}\\ \frac{dz}{dt}\\ \frac{d\omega}{dt}\\ \frac{dp}{dt}\\ \frac{dr}{dt}\end{pmatrix}=\begin{pmatrix}\frac{\partial f_x}{\partial q_1} & \frac{\partial f_x}{\partial q_2} & \frac{\partial f_x}{\partial q_3} & \cdots\cdots & \frac{\partial f_x}{\partial q_n}\\ \frac{\partial f_y}{\partial q_1} & \frac{\partial f_y}{\partial q_2} & \frac{\partial f_y}{\partial q_3} & \cdots\cdots & \frac{\partial f_y}{\partial q_n}\\ \frac{\partial f_z}{\partial q_1} & \frac{\partial f_z}{\partial q_2} & \frac{\partial f_z}{\partial q_3} & \cdots\cdots & \frac{\partial f_z}{\partial q_n}\\ \frac{\partial f_\omega}{\partial q_1} & \frac{\partial f_\omega}{\partial q_2} & \frac{\partial f_\omega}{\partial q_2} & \cdots\cdots & \frac{\partial f_\omega}{\partial q_n}\\ \frac{\partial f_p}{\partial q_1} & \frac{\partial f_p}{\partial q_2} & \frac{\partial f_p}{\partial q_3} & \cdots\cdots & \frac{\partial f_p}{\partial q_n}\\ \frac{\partial f_r}{\partial q_1} & \frac{\partial f_r}{\partial q_2} & \frac{\partial f_r}{\partial q_3} & \cdots\cdots & \frac{\partial f_r}{\partial q_n}\end{pmatrix}\begin{pmatrix}\frac{dq_1}{dt}\\ \frac{dq_2}{dt}\\ \frac{dq_3}{dt}\\ \vdots\\ \vdots\\ \frac{dq_n}{dt}\end{pmatrix}=J\begin{pmatrix}s_{lim1}\\ s_{lim2}\\ s_{lim3}\\ \vdots\\ \vdots\\ s_{limn}\end{pmatrix} \quad \text{Equation 5}$$

In Equation 5, J is a Jacobian matrix, is predetermined according to the machine 10 (such as a length of a link and a movable range of a link), and is stored in the storage unit 25 or defined in a program.

On the other hand, the upper limit value $A_{lim}$ of the acceleration of the tip of the machine 10 may be obtained by differentiating the upper limit value $S_{lim}$ of the speed of the tip of the machine 10 with respect to the time t or obtained from the upper limit values $a_{lim1}$ to $a_{limn}$ of the acceleration of the actuator 17 by forward kinematics.

The command limiting unit 28*b* limits at least one of the speed command and the acceleration command of the machine 10, based on the upper limit values $S_{lim}$ and $A_{lim}$ of at least one of the speed and the acceleration of the tip of the machine 10. In other words, the command limiting unit 28*b* limits at least one of the speed command and the acceleration command of the machine 10 in the motion program 35.

As described above, even when a viscous frictional force increases due to a low-temperature environment, the control device 20 tightens a motion limitation on the machine 10 in such a way that capacity of the actuator 17 is not exceeded. Accordingly, occurrence of an excessive error alarm of a position error can be prevented, and thus the machine 10 can continue motion.

On the other hand, when a viscous frictional force decreases due to a high-temperature environment, the control device 20 relaxes a motion limitation on the machine 10 in such a way that capacity of the actuator 17 is not exceeded. Accordingly, the machine 10 can perform motion relatively rapidly.

Further, the command limiting unit 28*b* sends, to the display unit 32, a display command that emphasizes and displays the motion command 36 of the actuator 17 or the machine 10 on which a motion limitation is imposed. As illustrated in FIG. 3, the display unit 32 may emphasize and display the motion command 36, based on the display command, in the edit window 33 of the motion program 35. The emphasized display of the motion command 36 is performed by, for example, displaying a background color of text of the motion command 36 in red and the like. Alternatively, in another embodiment in a programing environment on an icon basis instead of a text basis, the emphasized display may be performed by displaying an icon of the motion command 36 in red and the like. In this way, a user can visually recognize the motion command 36 of the machine 10 on which a limitation is imposed, and can easily recognize that the machine 10 is not performing motion as intended.

With reference to FIG. 2 again, the command limiting unit 28*b* sends, to the display unit 32, a display command that displays the upper limit values $s_{lim1}$ to $s_{limn}$ and $a_{lim1}$ to $a_{limn}$ of the speed and the acceleration of the actuator 17 or the upper limit values $S_{lim}$ and $A_{lim}$ of at least one of the speed and the acceleration of the machine 10. As illustrated in FIG. 3, the display unit 32 may display the upper limit values $s_{lim1}$ to $s_{limn}$ and $a_{lim1}$ to $a_{limn}$ of the motion of the actuator 17 or the upper limit values $S_{lim}$ and $A_{lim}$ of the machine 10 near the motion command 36, based on the display command, in the edit window 33 of the motion program 35. In the example in FIG. 3, since the machine 10 is in a low-temperature environment, it is clear that a speed command (100 mm/sec) of the actuator 17 or the machine 10 is limited to the upper limit value $S_{lim}$ (70 mm/sec) in accordance with a change in a viscous frictional force. In this way, a user can visually recognize an upper limit value of a motion command of the machine 10.

With reference to FIG. 2 again, the driving control unit 28*c* controls driving of the actuator 17, based on a motion command of the actuator 17 on which a motion limitation is imposed. Alternatively, in another embodiment, the driving control unit 28*c* converts the motion command 36 of the machine 10 on which a motion limitation is imposed to a motion command of n actuator 17, based on inverse kinematics, and controls driving of the actuator 17, based on the converted motion command of the actuator 17. The driving control unit 28*c* is formed of, for example, a motor driving control device (for example, a servo amplifier).

Further, the control device 20 may further include a stop time calculation unit 22 that calculates a stop time before operation of the machine 10, an operating time calculation unit 23 that calculates an operating time after operation of the machine 10, and a temperature state determination unit 24 that determines whether a state is a temperature state where a motion limitation is to be imposed on the machine 10, based on at least one of a detected temperature, the stop time, and the operating time.

The stop time calculation unit 22 calculates a stop time before operation of the machine 10 by measuring a time interval since the power is turned off (power OFF) until the power is turned on (power ON) by using a timer function of the control device 20. Alternatively, in another embodiment, the stop time calculation unit 22 may measure a time interval since the power is turned off (power OFF) until a motion start of the machine 10.

The operating time calculation unit 23 calculates an operating time after operation of the machine 10 by measuring a cumulative operating time since the power is turned on (power ON) until a current time by using the timer function of the control device 20. Alternatively, in another embodiment, the operating time calculation unit 23 may roughly calculate an operating time of the machine 10 by simply measuring a time interval since the power is turned on (power ON) until a current time by using the timer function of the control device 20.

The temperature state determination unit 24 determines whether a lubricant is in a low-temperature state to the extent that a motion limitation is to be imposed (tightened) on the machine 10 by determining whether a detected temperature T is lower than a threshold value (for example, 10° C.) and determining whether a stop time before operation of the machine 10 exceeds a threshold value (for example, 9 hours). When a stop time before operation of the machine 10 is short, there is a possibility that the machine 10 is still warm and a viscous frictional force at a detected temperature has not been changed much from a viscous frictional force at a reference temperature. Thus, a temperature state of a lubricant can be accurately determined by considering a stop time before operation of the machine 10.

On the other hand, the temperature state determination unit 24 determines whether a lubricant is in a high-temperature state to the extent that a motion limitation is to be imposed (relaxed) on the machine 10 by determining whether the detected temperature T exceeds a threshold value (for example, 40° C.). The threshold value of the detected temperature T and the threshold value of the stop time described above may be stored in the storage unit 25 or defined in a program.

When the detected temperature T falls outside a threshold value (for example, 10° C.<T<40° C.) (i.e., when a lubricant is determined to be in a low-temperature state or a high-temperature state), the temperature state determination unit 24 sends a frictional coefficient calculation command to the frictional coefficient calculation unit 26 or sends a frictional force calculation command to the frictional force calculation unit 27.

As described above, the frictional coefficient calculation unit 26 calculates each of the viscous frictional coefficients $\mu_d$ and $\mu_r$ at a detected temperature and a reference temperature, and sends the calculated viscous frictional coefficients $\mu_d$ and $\mu_r$ to the frictional force calculation unit 27. As described above, the frictional force calculation unit 27 calculates each of the viscous frictional forces $\tau_d$ and $\tau_r$ at the detected temperature and the reference temperature, and sends the calculated viscous frictional forces $\tau_d$ and $\tau_r$ to the control unit 28. As described above, the control unit 28 imposes a motion limitation on the machine 10, based on the change amount $\Delta\tau$ of the viscous frictional force between the detected temperature and the reference temperature, in such a way that capacity of the actuator 17 is not exceeded.

Further, when the temperature state determination unit 24 determines that a lubricant is in a low-temperature state and determines that an operating time after operation of the machine 10 exceeds a threshold value (for example, 10 minutes), the lubricant is already warm, and thus the temperature state determination unit 24 may send a reset command for a motion limitation (tightening) of the machine 10 to the command limiting unit 28*b*, and the command limiting unit 28*b* may reset the motion limitation (tightening) of the machine 10, based on the reset command. Alternatively, in another embodiment, when the temperature state determination unit 24 determines that a lubricant is in a low-temperature environment, and determines that an operating time after operation of the machine 10 exceeds a threshold value (for example, 10 minutes) and the detected temperature T at that time exceeds a threshold value (for example, 10° C.), the temperature state determination unit 24 may send the reset command for the motion limitation (tightening) of the machine 10 to the command limiting unit 28*b*. In this way, a temperature state of a lubricant can be more accurately determined.

On the other hand, when the temperature state determination unit 24 determines that a lubricant is in a high-temperature environment and determines that the detected temperature T exceeds a maximum allowable threshold value (for example, 90° C.), the temperature state determination unit 24 sends a reset command for a motion limitation (relaxation) of the machine 10 to the command limiting unit 28*b*. The maximum allowable threshold value of the detected temperature T means a maximum allowable temperature in terms of specifications of the actuator 17 (for example, an electric motor). For example, when the actuator 17 exceeds a maximum allowable temperature of 90° C., the actuator 17 is to be overheated, and thus relaxation of a motion limitation on the machine 10 needs to be reset.

Further, when the temperature state determination unit 24 determines that a lubricant is in a temperature state to the extent that a motion limitation is to be imposed on the machine 10, the temperature state determination unit 24 may send, to the display unit 32, a display command that displays a warning message 34 indicating that the lubricant is in a low-temperature state or a high-temperature state. In the example in FIG. 3, the display unit 32 displays the warning message 34 indicating that a lubricant is in a low-temperature state, based on the display command. In this way, a user can visually recognize that a lubricant is in a temperature state to the extent that a motion limitation (tightening or relaxation) is to be imposed on the machine 10.

With reference to FIG. 2 again, instead of acquiring a detected temperature from the temperature sensor 18, the machine system 1 may further include the input unit 31 with which a user inputs a designated temperature instead of a detected temperature. The control device 20 calculates a viscous frictional force from the viscous frictional force estimation equation (Equation 1) without using a detection value (a torque detection value and a speed detection value) and the like of the actuator 17 at a detected temperature, and can thus calculate a viscous frictional force even at a designated temperature other than a detected temperature.

In this way, a user can simulate a motion limitation on the machine 10 due to a viscous frictional force at an input designated temperature. In other words, when a designated temperature is a low temperature, a motion speed and a motion execution time in a state where a motion limitation on the machine 10 is tightened can be simulated. Meanwhile, when a designated temperature is a high temperature, a motion speed and a motion execution time in a state where a motion limitation on the machine 10 is relaxed can be simulated.

Figure 4:
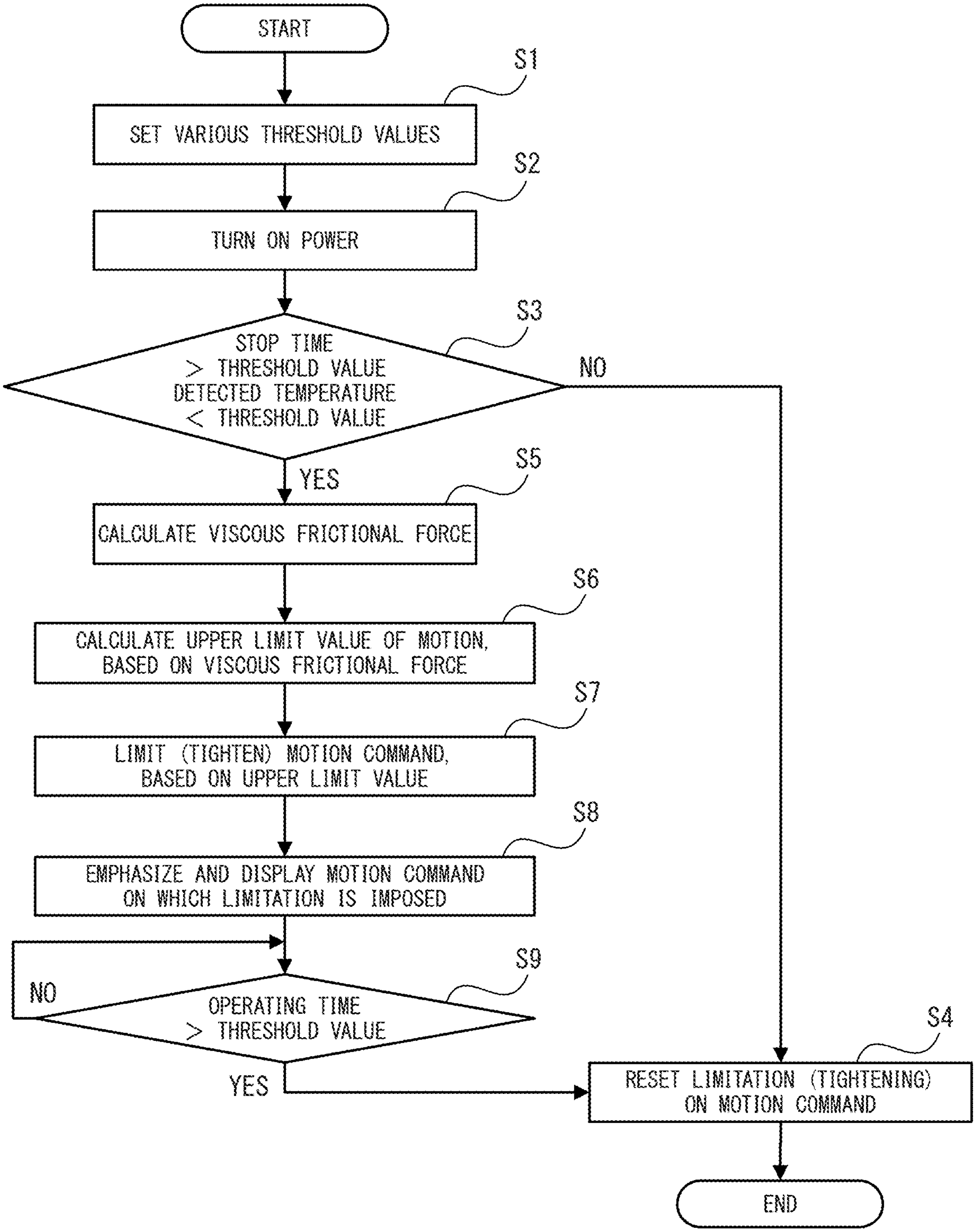
FIG. 4 is a flowchart of a low-temperature state of the machine system according to one embodiment.

Hereinafter, one example of motion of the machine system 1 according to the present embodiment will be described in detail. FIG. 4 is a flowchart of a low-temperature state of the machine system 1 according to the present embodiment. First, in step S1, a threshold value of a detected temperature, a threshold value of a stop time, and a threshold value of an operating time after operation of the machine 10 are set in advance. The threshold value of the detected temperature, the threshold value of the stop time, and the threshold value of the operating time after operation of the machine 10 that are stored in the storage unit 25 of the control device 20 or a storage unit of an external device are used, but, in another embodiment, the threshold values input from the input unit 31 of the teaching device 30 may be used. In step S2, when the power of the control device 20 is turned on, the temperature acquisition unit 21 acquires a detected temperature, whereas the stop time calculation unit 22 calculates a stop time before operation of the machine 10, and the operating time calculation unit 23 calculates an operating time after operation of the machine 10.

In step S3, the temperature state determination unit 24 determines whether a lubricant is in a low-temperature state to the extent that a motion limitation is to be imposed (tightened) on the machine 10 by determining whether the detected temperature T is lower than a threshold value (for example, 10° C.) and determining whether a stop time before operation of the machine 10 exceeds a threshold value (for example, 9 hours). When the temperature state determination unit 24 determines that the detected temperature T is equal to or higher than the threshold value (for example, 10° C.) or the stop time does not exceed the threshold value (for example, 9 hours) (NO in step S3), in step S4, the command limiting unit 28*b* resets a limitation (tightening) on a motion command of the actuator 17 or the machine 10 that has already been performed, and ends a function of dealing with a change in viscous friction.

On the other hand, when the temperature state determination unit 24 determines that the detected temperature T is lower than the threshold value (for example, 10° C.) and the stop time exceeds the threshold value (for example, 9 hours) (YES in step S3), the warning message 34 warning that the lubricant is in the low-temperature state where the motion limitation on the machine 10 is to be tightened may be displayed on the display unit 32.

Further, in order to impose (tighten) the motion limitation on the machine 10, in step S5, the frictional force calculation unit 27 calculates each of the viscous frictional forces $\tau_d$ and $\tau_r$ at the detected temperature and a reference temperature, based on the viscous frictional force estimation equation (Equation 1). It should be noted that a viscous frictional coefficient is stored in the storage unit 25 or a storage unit of an external device by performing an experiment in advance, or the frictional coefficient calculation unit 26 calculates each of the viscous frictional coefficients $\mu_d$ and $\mu_r$ at the detected temperature and the reference temperature. Alternatively, the frictional force calculation unit 27 may calculate each of the viscous frictional forces $\mu_d$ and $\mu_r$ at the detected temperature and the reference temperature, based on a temperature-frictional force database, without using the viscous frictional coefficients $\mu_d$ and $\mu_r$.

In step S6, the upper limit calculation unit 28*a* calculates the upper limit values $s_{lim1}$ to $s_{limn}$ and $a_{lim1}$ to $a_{limn}$ of motion of the actuator 17 or the upper limit values $S_{lim}$ and $A_{lim}$ of motion of the machine 10, based on the viscous frictional forces $\tau_d$ and $\tau_r$ at the detected temperature and the reference temperature, in such a way that capacity of the actuator 17 is not exceeded. In step S7, the command limiting unit 28*b* imposes (tightens) a limitation on the motion command 36 of the actuator 17 or the machine 10, based on the upper limit value.

Further, in step S8, the command limiting unit 28*b* may emphasize and display, on the display unit 32, the motion command 36 on which the motion limitation is imposed (tightened). Furthermore, the command limiting unit 28*b* may display, on the display unit 32, the upper limit values $s_{lim1}$ to $s_{limn}$ and $a_{lim1}$ to $a_{limn}$ or $S_{lim}$ and $A_{lim}$ of motion near the motion command 36 on which the motion limitation is imposed.

In the low-temperature state where the motion limitation on the machine 10 is tightened, in step S9, the temperature state determination unit 24 determines whether an operating time of the machine 10 has exceeded a threshold value (for example, 10 minutes). When the temperature state determination unit 24 determines that the operating time of the machine 10 has not exceeded the threshold value (for example, 10 minutes) (NO in step S9), the temperature state determination unit 24 determines that a lubricant is still in the low-temperature state, and repeats the determination in step S9 until the operating time exceeds the threshold value (for example, 10 minutes).

On the other hand, when the temperature state determination unit 24 determines that the operating time of the machine 10 has exceeded the threshold value (for example, 10 minutes) in the low-temperature state where the motion limitation on the machine 10 is tightened (YES in step S9), the temperature state determination unit 24 determines that the lubricant has gone through the low-temperature state, and, in step S4, the command limiting unit 28*b* resets the limitation (tightening) on the motion command of the actuator 17 or the machine 10, and ends a function of dealing with a change in viscous friction.

Figure 5:
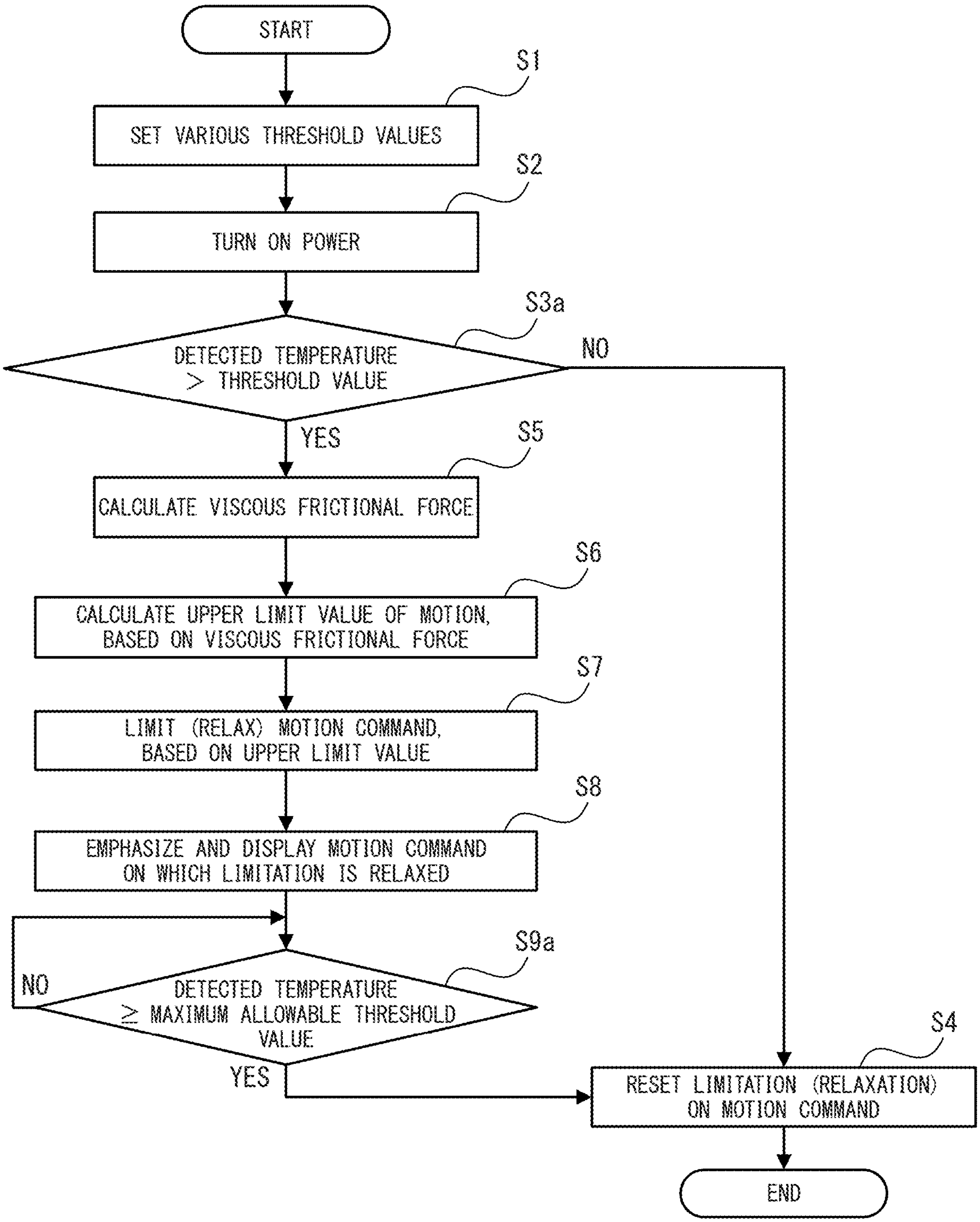
FIG. 5 is a flowchart of a high-temperature state of the machine system according to one embodiment.

FIG. 5 is a flowchart of a high-temperature state of the machine system 1 according to the present embodiment. First, in step S1, a threshold value of a detected temperature, a threshold value of a stop time, and a threshold value of an operating time after operation of the machine 10 are set in advance. The threshold value of the detected temperature, the threshold value of the stop time, and the threshold value of the operating time after operation of the machine 10 that are stored in the storage unit 25 of the control device 20 or a storage unit of an external device are used, but, in another embodiment, the threshold values input from the input unit 31 of the teaching device 30 may be used. In step S2, when the power of the control device 20 is turned on, the temperature acquisition unit 21 acquires a detected temperature, whereas the stop time calculation unit 22 calculates a stop time before operation of the machine 10, and the operating time calculation unit 23 calculates an operating time after operation of the machine 10.

In step S3*a*, the temperature state determination unit 24 determines whether a lubricant is in a high-temperature state to the extent that a motion limitation is to be imposed (relaxed) on the machine 10 by determining whether the detected temperature T is equal to or higher than a threshold value (for example, 40° C.). When the temperature state determination unit 24 determines that the detected temperature T is lower than the threshold value (for example, 40° C.) (NO in step S3*a*), in step S4, the command limiting unit 28*b* resets a limitation (tightening) on a motion command of the actuator 17 or the machine 10 that has already been performed, and ends a function of dealing with a change in viscous friction.

On the other hand, when the temperature state determination unit 24 determines that the detected temperature T is equal to or higher than the threshold value (for example, 40° C.) (YES in step S3*a*), the warning message 34 warning that the lubricant is in the high-temperature state where the motion limitation on the machine 10 is relaxed may be displayed on the display unit 32.

Further, in order to impose (relax) the motion limitation on the machine 10, in step S5, the frictional force calculation unit 27 calculates each of the viscous frictional forces $\tau_d$ and $\tau_r$ at the detected temperature and a reference temperature, based on the viscous frictional force estimation equation (Equation 1). It should be noted that a viscous frictional coefficient is stored in the storage unit 25 or a storage unit of an external device by performing an experiment in advance, or the frictional coefficient calculation unit 26 calculates each of the viscous frictional coefficients $\mu_d$ and $\mu_r$ at the detected temperature and the reference temperature. Alternatively, the frictional force calculation unit 27 may calculate each of the viscous frictional forces $\tau_d$ and $\tau_r$ at the detected temperature and the reference temperature, based on a temperature-frictional force database, without using the viscous frictional coefficients $\mu_d$ and $\mu_r$.

In step S6, the upper limit calculation unit 28*a* calculates the upper limit values $s_{lim1}$ to $s_{limn}$ and $a_{lim1}$ to $a_{limn}$ of motion of the actuator 17 or the upper limit values $S_{lim}$ and $A_{lim}$ of motion of the machine 10, based on the viscous frictional forces $\tau_d$ and $\tau_r$ at the detected temperature and the reference temperature, in such a way that capacity of the actuator 17 is not exceeded. In step S7, the command limiting unit 28*b* imposes (relaxes) a limitation on the motion command 36 of the actuator 17 or the machine 10, based on the upper limit value.

Further, in step S8, the command limiting unit 28*b* may emphasize and display, on the display unit 32, the motion command 36 on which the motion limitation is imposed (relaxed). Furthermore, the command limiting unit 28*b* may display, on the display unit 32, the upper limit values $s_{lim1}$ to $s_{limn}$ and $a_{lim1}$ to $a_{limn}$ or $S_{lim}$ and $A_{lim}$ of motion near the motion command 36 on which the motion limitation is imposed.

In the high-temperature state where the motion limitation on the machine 10 is relaxed, in step S9*a*, the temperature state determination unit 24 determines whether the detected temperature T is equal to or higher than a maximum allowable threshold value (for example, 90° C.) in order to prevent overheating of the actuator 17. When the temperature state determination unit 24 determines that the detected temperature T is lower than the maximum allowable threshold value (for example, 90° C.) (NO in step S9*a*), the temperature state determination unit 24 determines that the detected temperature T is in a state where there is room for the maximum allowable temperature in terms of specifications of the actuator 17, and repeats the determination in step S9*a* until the detected temperature T is equal to or higher than the maximum allowable threshold value (for example, 90° C.).

On the other hand, when the temperature state determination unit 24 determines that the detected temperature T is equal to or higher than the maximum allowable threshold value (for example, 90° C.) in the high-temperature state where the motion limitation on the machine 10 is relaxed (YES in step S9*a*), the temperature state determination unit 24 determines that the detected temperature T has risen to the vicinity of the maximum allowable temperature in terms of specifications of the actuator 17, and, in step S4, the command limiting unit 28*b* resets the limitation (relaxation) on the motion command of the actuator 17 or the machine 10, and ends a function of dealing with a change in viscous friction.

As described above, according to the present embodiment, even when a viscous frictional force increases due to a low-temperature environment, a motion limitation on the machine 10 is tightened in such a way that capacity of the actuator 17 is not exceeded. Accordingly, occurrence of an excessive error alarm of a position error can be prevented, and thus the machine 10 can continue motion. On the other hand, when a viscous frictional force decreases due to a high-temperature environment, a motion limitation on the machine 10 is relaxed in such a way that capacity of the actuator 17 is not exceeded. Accordingly, the machine 10 can perform motion relatively rapidly.

Further, when a state is determined to be a temperature state where a motion limitation is to be imposed on the machine 10, a motion command of the actuator 17 or the machine 10 on which the motion limitation is imposed (tightened or relaxed) is emphasized and displayed on the display unit 32, and thus a user can visually recognize the motion command of the actuator 17 or the machine 10 on which the limitation is imposed, and can easily recognize that the machine 10 is not performing motion as intended.

While various embodiments have been described in the present specification, the present invention is not limited to the embodiments described above, and it will be understood that various modifications can be made within the scope of the claims below.

REFERENCE SIGNS LIST

1 Machine system
10 Machine
11 Base
12 Revolving barrel
13 First arm
14 Second arm
15 Wrist unit
16 Tool
17 Actuator
18 Temperature sensor
20 Control device
21 Temperature acquisition unit
22 Stop time calculation unit
23 Operating time calculation unit
24 Temperature state determination unit
25 Storage unit
26 Frictional coefficient calculation unit
27 Frictional force calculation unit
28 Control unit
28*a* Upper limit calculation unit
28*b* Command limiting unit
28*c* Driving control unit
30 Teaching device (display device)
31 Input unit
32 Display unit
33 Edit window
34 Warning message
35 Motion program
36 Motion command
C1 Machine coordinate system
C2 Tool coordinate system
J1 to J6 Axis line

The invention claimed is:

1. A control device, comprising:

a temperature acquisition unit configured to acquire a detected temperature;

a frictional force calculation unit configured to calculate a viscous frictional force generated in an actuator of a machine at the detected temperature and a reference temperature; and a control unit configured to impose a motion limitation on the machine, based on the viscous frictional force, in such a way that capacity of the actuator is not exceeded, wherein the control unit is configured to impose the motion limitation on the machine, based on a change amount of the viscous frictional force between the detected temperature and the reference temperature.

2. The control device according to claim 1, wherein the control unit includes an upper limit calculation unit configured to calculate an upper limit value of motion of the actuator or the machine, based on the viscous frictional force.

3. The control device according to claim 2, wherein the control unit further includes a command limiting unit configured to limit a motion command of the actuator or the machine, based on the upper limit value.

4. The control device according to claim 1, further comprising:

a frictional coefficient calculation unit configured to calculate a viscous frictional coefficient at the detected temperature and the reference temperature.

5. The control device according to claim 1, further comprising:

a display unit that emphasizes and displays a motion command of the actuator or the machine on which the motion limitation is imposed.

6. The control device according to claim 1, further comprising:

a display unit that displays an upper limit value of motion of the machine near a motion command of the actuator or the machine.

7. The control device according to claim 1, further comprising:

a stop time calculation unit configured to calculate a stop time before operation of the machine;

an operating time calculation unit configured to calculate an operating time after the operation of the machine; and a temperature state determination unit configured to determine whether a state is a temperature state where the motion limitation is to be imposed on the machine, based on at least one of the detected temperature, the stop time, and the operating time.

8. The control device according to claim 1, further comprising:

a display unit that displays a temperature state of a lubricant of the actuator.

9. The control device according to claim 1, further comprising:

an input unit configured to receive, from a user, an input of a designated temperature instead of the detected temperature.

10. A machine system, comprising:

a machine;

a temperature sensor;

a temperature acquisition unit configured to acquire a detected temperature from the temperature sensor;

a frictional force calculation unit configured to calculate a viscous frictional force generated in an actuator of the machine at the detected temperature and a reference temperature; and a control unit configured to impose a motion limitation on the machine, based on the viscous frictional force, in such a way that capacity of the actuator is not exceeded, wherein the control unit is configured to impose the motion limitation on the machine, based on a change amount of the viscous frictional force between the detected temperature and the reference temperature.

* * * * *